(12) United States Patent
Ichinose et al.

(10) Patent No.: US 8,555,778 B2
(45) Date of Patent: Oct. 15, 2013

(54) FRESHNESS PROLONGING DEVICE FOR FOODSTUFF

(75) Inventors: Minato Ichinose, Kobe (JP); Mitsuru Fukumoto, Okayama (JP); Masayuki Ikeda, Amagasaki (JP)

(73) Assignees: Minato Ichinose, Hyogo (JP); Tsuneo Tounan, Okayama (JP); Mitsuru Fukumoto, Okayama (JP); Kiyoshi Takeda, Hyogo (JP)

( * ) Notice: Subject to any disclaimer, the term of this patent is extended or adjusted under 35 U.S.C. 154(b) by 702 days.

(21) Appl. No.: 12/800,903

(22) Filed: May 25, 2010

(65) Prior Publication Data

US 2011/0290123 A1  Dec. 1, 2011

(51) Int. Cl.
*A23L 3/32* (2006.01)
*H05B 6/46* (2006.01)

(52) U.S. Cl.
USPC ............. 99/358; 99/451; 99/483; 219/771; 219/773; 219/780

(58) Field of Classification Search
USPC ............ 99/358, 451, 483; 219/771, 773, 779, 219/780
See application file for complete search history.

(56) References Cited

U.S. PATENT DOCUMENTS

| | | | | |
|---|---|---|---|---|
| 4,296,299 A * | 10/1981 | Stottmann et al. | ............ | 219/771 |
| 4,303,820 A * | 12/1981 | Stottmann et al. | ............ | 219/771 |
| 5,695,671 A * | 12/1997 | Landwehr et al. | ............ | 219/779 |
| 6,138,555 A * | 10/2000 | Hata | ............................... | 99/451 |
| 7,523,541 B2 * | 4/2009 | Sakama et al. | .................. | 29/600 |

FOREIGN PATENT DOCUMENTS

JP  2007-212046  8/2007

* cited by examiner

*Primary Examiner* — Reginald L Alexander
(74) *Attorney, Agent, or Firm* — DLA Piper LLP (US)

(57) ABSTRACT

The invention provides a freshness prolonging device for foodstuff for prolonging a shelf life of foodstuff by storing the foodstuff in a high electric field atmosphere. The freshness prolonging device for foodstuff includes an electrode plate to be removably mounted on a surface opposed to foodstuff stored in a food storage unit and a power source for applying a high voltage to the electrode plate. The electrode plate is composed of an electrically conductive rubber sheet hermetically sealed with a cover composed of a resin sheet.

3 Claims, 5 Drawing Sheets

FRESHNESS PROLONGING DEVICE FOR FOODSTUFF

BACKGROUND OF THE INVENTION (1) Field of the Invention

The present invention relates to a freshness prolonging device for foodstuff which prolongs a shelf life of foodstuff by storing foodstuff in a high electric field atmosphere.

(2) Description of Related Art

When foodstuff such as fresh foodstuff (e.g., vegetables, fish and shellfish) is stored, it is refrigerated or frozen in a food storage unit such as a refrigerator or a refrigerated showcase. In recent years, a freshness prolonging device for foodstuff has been proposed. The freshness prolonging device stores foodstuff in a high electric field atmosphere. Such a freshness prolonging device for foodstuff is usually used together with a food storage unit to prolong a shelf life of foodstuff. For example, JP 2007-212046 A discloses a vegetable compartment of a refrigerator for storing fresh foodstuff in a high electric field atmosphere.

More specifically, JP 2007-212046 A discloses a refrigerator which can create a high electric field atmosphere in its vegetable compartment by externally applying a high voltage to a pair of electrodes mounted on, in an electrically insulated manner, a ceiling surface and a bottom surface of the vegetable compartment ([0006]). Further, JP 2007-212046 A describes that the application of a high electric field to vegetables has an effect of reducing the respiration of the vegetables ([0021]). The electrode plates are each formed by covering, with an insulating material, a metal flat plate, mesh or a resin plate having a metal film evaporated thereon ([0009] to [0011]). A high voltage to be applied to the electrode plates may be either a DC voltage or an AC voltage. However, from the viewpoint of obtaining the effect of reducing the respiration of vegetables, a voltage of 10 kV or less is preferably applied to the electrode plates to create a high electric field of 0.05 kV/cm or higher ([0021]). More specifically, it seems that a voltage of 3 to 12 kV is applied to the electrode plates ([0013]).

As described above, the electrode plates disclosed in JP 2007-212046 are each formed by covering, with an insulating material, a metal flat plate or mesh or a resin plate having a metal film evaporated thereon. In either case, the electrode plates are mainly made of a conductive metal (having a volume intrinsic resistivity on the order of $10^{-6}$ ·Ωcm). Therefore, it is necessary to apply a voltage of 3 kV or higher in order to uniformly apply a high voltage to the entire electrode plates and create a uniform high electric field atmosphere. The electrode plates disclosed in JP 2007-212046 ensures an electrically isolated state by embedding the electrode plates in a ceiling surface and a bottom surface of the vegetable compartment. It follows that JP 2007-212046 supposes non-removal electrode plates. This, however, leads to the necessity to provide the electrode plates in each food storage unit. Further, there is also a problem that the electrode plates cannot be used as a freshness prolonging device for foodstuff together with existing food storage units.

SUMMARY OF THE INVENTION

The present invention is directed to a freshness prolonging device for foodstuff which prolongs the shelf life of foodstuff by storing the foodstuff in a high electric field atmosphere, including: an electrode plate to be removably mounted on a surface opposed to foodstuff stored in a food storage unit; and a power source for applying a high voltage to the electrode plate, wherein the electrode plate is composed of an electrically conductive rubber sheet electrically insulated from outside. The electrode plate and the power source are usually connected to each other through a feeder cable. A high voltage to be applied from the power source to the electrode plate may be either a DC voltage or an AC voltage. However, a high AC voltage is preferably applied considering that a commercial AC power source is used and that changes in high electric field with time are effective for storage of foodstuff.

The phrase "surface opposed to foodstuff stored in a food storage unit" means a sidewall surface, a ceiling surface, or a bottom surface constituting a food storage space within a food storage unit (e.g., a showcase); a bottom surface on which a food storage unit (e.g., a container) containing foodstuff therein is placed, a sidewall surface surrounding the food storage unit, or a ceiling surface located above a food storage unit. When mounted on a sidewall surface (vertical surface) or a ceiling surface (upper horizontal surface), the electrode plate is removably attached thereto using, for example, a double-sided adhesive tape. On the other hand, when mounted on a bottom surface, the electrode plate is directly placed thereon. The power source may be placed together with the electrode plate in a food storage space of a food storage unit, but is preferably placed outside a food storage unit from the viewpoint of preventing the occurrence of condensation and improving handleability.

The electrode plate of the freshness prolonging device for foodstuff according to the present invention is preferably composed of an electrically conductive rubber sheet having a volume intrinsic resistivity (30 Ωcm to 500 Ωcm) intermediate between that of a metal plate (on the order of $10^{-6}$ Ωcm or less) and that of an insulating material (on the order of $10^6$ Ωcm or more). By setting the volume intrinsic resistivity of the electrode plate to a value within the above range, a high electric field atmosphere can be created over a wide range while a relatively-low high voltage (2 kV or less) is uniformly applied to the entire electrode plate. Such an electrically conductive rubber sheet can be used like a plate member by appropriately selecting raw materials or increasing its thickness, but a commonly-available one is thin and flexible, and therefore the electrode plate can be easily mounted on or removed from its mounting surface. Further, even if the electrode plate is larger than its mounting surface, the size of the electrode plate can be adjusted by bending or folding back its end portion(s) so as to suit the size of the mounting surface.

The electrode plate may be formed by hermetically sealing the electrically conductive rubber sheet with a cover composed of a resin sheet to electrically insulate the electrically conductive rubber sheet from outside. The cover isolates the electrically conductive rubber sheet from a food storage space and prevents the occurrence of condensation on the electrically conductive rubber sheet. Alternatively, the electrode plate may be formed by interposing an insulating sheet between the surface, on which the electrode plate is to be removably mounted, and the electrically conductive rubber sheet. This makes it possible to prevent a decrease in applied voltage resulting from a leak current flowing through the surface on which the electrode plate is removably mounted. The insulating sheet is preferably a resin sheet having similar flexibility to the electrically conductive rubber sheet, and is more preferably a foamed resin sheet having elasticity. Therefore, the electrode plate is preferably formed by hermetically sealing, with a cover composed of a resin sheet, the electrically conductive rubber sheet together with an insulating sheet to be interposed between the surface, on which the electrode plate is to be removably mounted, and the electrically conductive rubber sheet.

According to the present invention, it is possible to provide a freshness prolonging device for foodstuff, which is capable of creating a uniform high electric field atmosphere throughout an electrode plate by applying a relatively-low high voltage to the electrode plate. The application of a relatively-low high voltage to the electrode plate has an effect of reducing power consumption and the effect of reducing damage caused by electric leakage or electric shock. Further, a uniform high electric field atmosphere can be created throughout the electrode plate, which means that the freshness prolonging effect of a high electric field can be evenly given to, for example, all the foodstuff placed on the entire electrode plate.

The freshness prolonging device for foodstuff according to the present invention can be used together with existing food storage units because the electrode plate is composed of an electrically conductive rubber sheet having flexibility. The freshness prolonging device for foodstuff can be removably mounted on a mounting target, and can be easily handled.

DETAILED DESCRIPTION OF PREFERRED EMBODIMENTS

Figure 1:
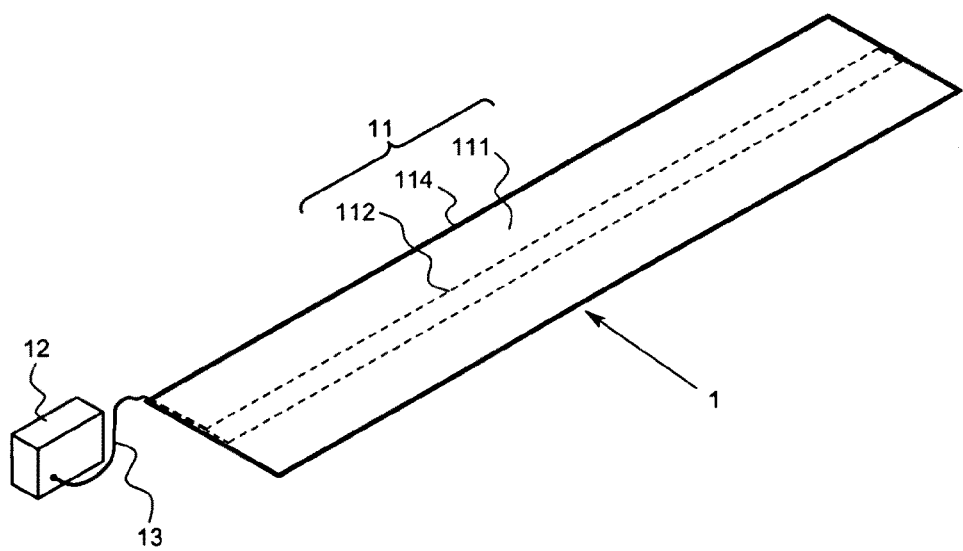
FIG. 1 is an entire perspective view illustrating one example of a freshness prolonging device for foodstuff according to the present invention.

Hereinafter, the best mode for carrying out the present invention will be described with reference to the accompanying drawings.

A freshness prolonging device 1 for foodstuff according to the present invention can be used together with various conventionally-known food storage units. Hereinafter, a typical example of the usage of the freshness prolonging device 1 for foodstuff according to the present invention will be described with reference to a case where an electrode plate 11 is placed on a bottom surface 211 constituting a food storage space 21 of a showcase 2.

As illustrated in FIG. 1, the freshness prolonging device 1 for foodstuff according to the present invention includes an electrode plate 11 and a power source 12 for applying a high voltage to the electrode plate 11. The electrode plate 11 has an outer shape similar to that of a bottom surface 211 constituting a food storage space 21 of a showcase 2 which will be described later. The electrode plate 11 is connected to the power source 12 through a feeder cable 13. The electrode plate 11 is placed in the showcase 2 (food storage space 21), but the power source 12 is placed outside the showcase 2. The power source 12 can have any conventionally-known structure. Generally, the power source 12 is connected to commercial power supply (not shown) to boost a voltage to a high level to apply a high voltage to the electrode plate 11. At this time, a commercial. AC voltage may be converted to a DC voltage. However, changes in a high electric field atmosphere are effective for storage of foodstuff, and the power source 12 can be made simpler by configuring it to act only as a voltage booster. For this reason, an AC high voltage is preferably applied to the electrode plate 11 through the feeder cable 13 by allowing the power source 12 to boost a commercial AC voltage without converting it to a DC voltage.

Figure 2:
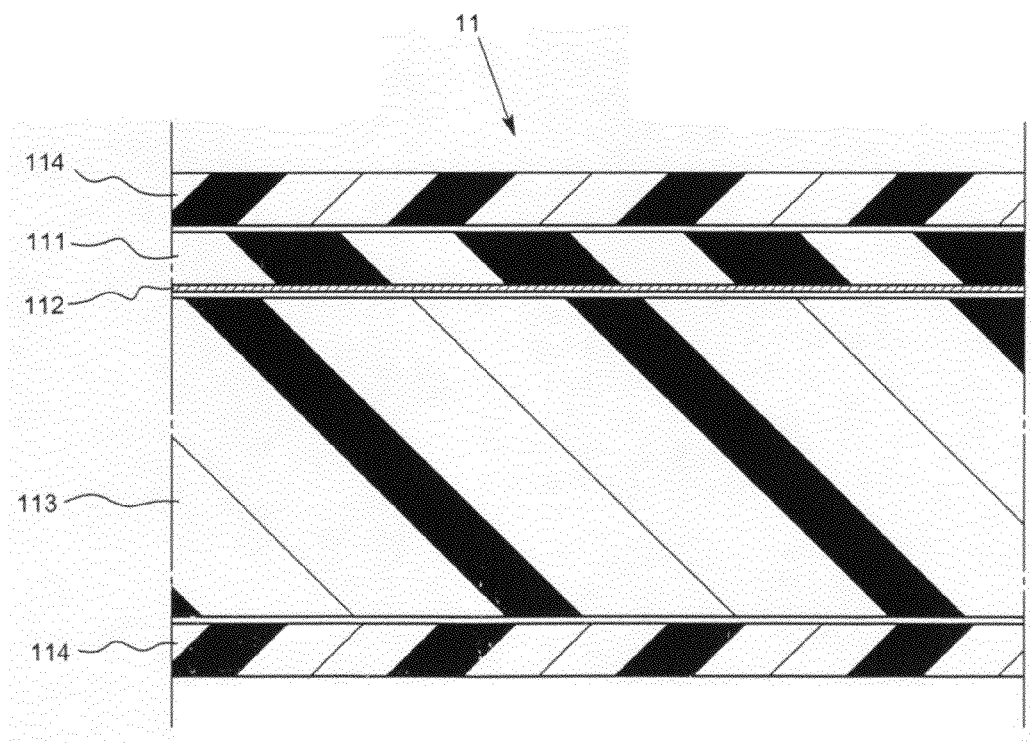
FIG. 2 is a sectional view illustrating a cross-sectional structure of an electrode plate of the freshness prolonging device for foodstuff according to the present example.

As illustrated in FIG. 2, the electrode plate 11 which is a characteristic of the present invention includes an electrically conductive rubber sheet 111, a plate-shaped electrode terminal 112, an insulating sheet 113 made of a foamed resin, and a cover 114 composed of a resin sheet. The electrode plate 11 is formed by attaching the electrode terminal 112 to the back surface of the electrically conductive rubber sheet 111, laminating the electrically conductive rubber sheet 111 and the insulating sheet 113 together so that the electrode terminal 112 is interposed therebetween, and hermetically sealing, with the cover 114, the electrically conductive rubber sheet 111 together with the insulating sheet 113. According to the present example, the electrode plate 11 is placed in the showcase 2 in such a manner that the back surface of the electrode plate 11 is in contact with the bottom surface 211 constituting the food storage space 21 of the showcase 2. It is to be noted herein that one of the surfaces of the electrode plate 11 located on the electrically conductive rubber sheet 111 side is defined as a front surface and the other surface of the electrode plate 11 located on the insulating sheet 113 side is defined as a back surface. As described above, although the electrically conductive rubber sheet 111 and the insulating sheet 113 are together hermetically sealed with the cover 114, the front and back surfaces of the electrode plate 11 can be distinguished from each other by touch because the insulating sheet 113 used in the present example is a foamed resin sheet. The front and back surfaces of the electrode plate 11 can be more easily distinguished by coloring the surfaces of the cover 14 located on the front and back surface sides of the electrode plate 11 with different colors or by putting different marks on them.

The electrically conductive rubber sheet 111 is made of semiconductive material with a volume intrinsic resistivity of 30 to 500 Ωcm (preferably 50 to 300 Ωcm) obtained by, for example, mixing natural rubber (NR) or synthetic rubber such as chloroprene rubber (CR) or nitrile rubber (NBR) and carbon powder. From the viewpoint of ensuring the flexibility of the electrode plate 11, the thickness of the electrically conductive rubber sheet 111 is set to a value in the range of 0.5 to 10 mm (preferably in the range of 1 to 5 mm). The feeder cable 13 is not particularly limited as long as a high voltage can be applied to the electrically conductive rubber sheet 111. According to the present example, the feeder cable 13 is connected to the plate-shaped electrode terminal 112 constituted by a metal plate or mesh (e.g., made of brass or copper) and the electrode terminal 112 is attached to the back surface of the electrically conductive rubber sheet 111. The thickness of the metal plate or mesh is set to 0.05 to 0.5 mm so as not to impair the flexibility of the electrically conductive rubber sheet 111.

The insulating sheet 113 is not particularly limited as long as it is a flexible material that can physically set apart the electrically conductive rubber sheet 111, from the bottom surface 211 constituting the food storage space 21 of the showcase 2. The insulating sheet 113 can be made of any conventionally-known insulating material. The reason why the electrically conductive rubber sheet 111 is physically set apart from the bottom surface 211 constituting the food storage space 21 of the showcase 2 is to ensure electrical insulation between a flexible rubber and the bottom surface 211. The thickness of the insulating sheet 113 is preferably as large as possible. However, if the insulating sheet 113 is too thick, the flexibility of the electrically conductive rubber sheet 111 is impaired. For this reason, according to the present example, a foamed resin sheet (e.g., made of foamed polyethylene or the like) is used as the insulating sheet 113 to ensure a sufficiently large thickness without impairing the flexibility of the electrically conductive rubber sheet 111. The use of a foamed resin sheet as the insulating sheet 113 allows the electrode plate 111 to also serve as a cushion on which foodstuff is placed.

The cover 114 may be the one which can hermetically seal the electrically conductive rubber sheet 111 together with the insulating sheet 113. The cover 114 is preferably made of a material not having moisture permeability between inside and outside to prevent condensation from forming on at least the electrical conductive rubber sheet 111. According to the present example, a resin sheet made of fiber-reinforced polyvinyl chloride is used as the cover 114. As described above, the front and back surfaces of the electrode plate 11 obtained by laminating the electrically conductive rubber sheet 111 and the insulating sheet 113 together need to be distinguished from each other. Therefore, it is preferred that the front and back surfaces of the electrode plate 11 are colored with different colors so as to be visually distinguishable from each other with ease. In this regard, the surface of the cover 114 located on the front surface side of the electrode plate 11 may be colored with the same color as the bottom surface 211 constituting the food storage space 21 of the showcase 2. This makes it possible to eliminate a sense of incongruity when the electrode plate 11 is placed on the bottom surface 211 constituting the food storage space 21 of the showcase 2.

Figure 3:
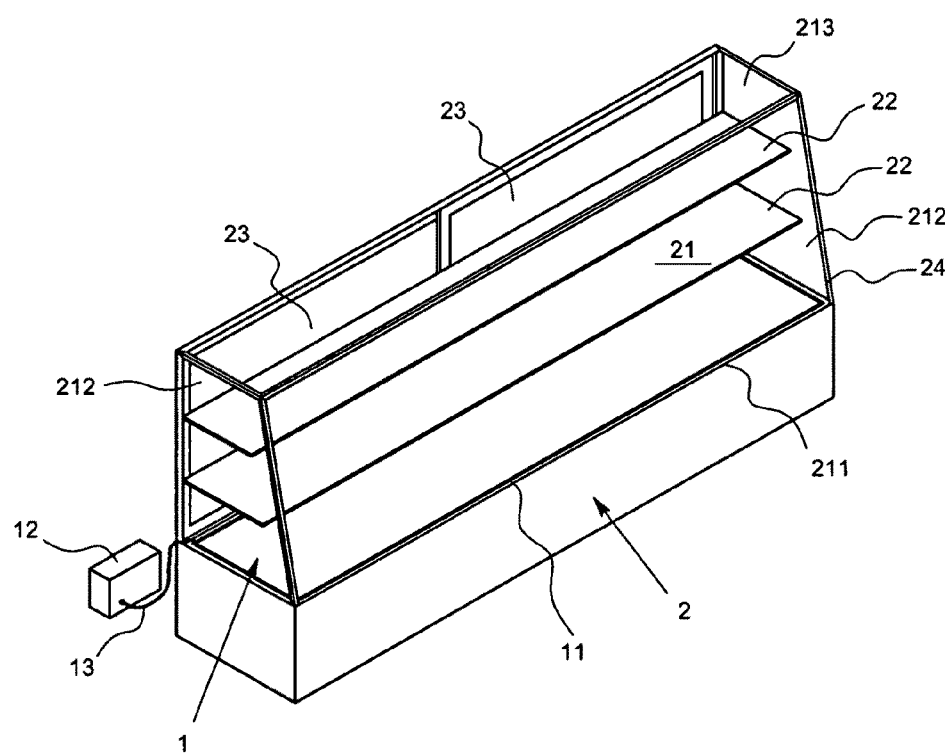
FIG. 3 is a perspective view of a showcase (food storage unit) to which the freshness prolonging device for foodstuff according to the present example is applied.

According to the present example, as illustrated in, for example, FIG. 3, the electrode plate 11 of the freshness prolonging device 1 for foodstuff is placed on the bottom surface 211 constituting the food storage space 21 of the showcase 2, and the feeder cable 13 is pulled out of the showcase 2 through a gap in a back door 23 of the showcase 2 to apply a high voltage from the power source 12 placed outside the showcase 2 to the electrode plate 11. The food storage space 21 is a space enclosed with the bottom surface 211, side surfaces 212, a ceiling surface 213, the back door 23 through which foodstuff is taken in and out, and a glass front surface 24 through which foodstuff stored in the showcase 2 can be seen. The bottom surface 211, the side surfaces 212, and the ceiling surface 213 are each constituted by a metal plate. According to the present example, as described above, the electrode plate 11 is placed on the bottom surface 211 constituting the food storage space 21. However, the electrode plate 11 may be attached to the inside of the side surface 212 or the ceiling surface 213 constituting the food storage space 21 as long as it does not interfere with the display of foodstuff.

According to the present example, the showcase 2 has two shelf plates 22, 22, on which foodstuff (e.g., cakes) can be placed, in addition to the bottom surface 211 in the food storage space 21. The electrode plate 11 is placed only on the bottom surface 211 because a high electric field atmosphere created by the electrode plate 11 extends over the entire food storage space 21 of the showcase 2. In this regard, the surface of the cover 114 located on the front surface side of the electrode plate 11 is preferably colored with the same color as the bottom surface 211 constituting the food storage space 21 of the showcase 2. This is because the color balance of the showcase 2 is not lost as a whole even when the electrode plate 11 is placed on the bottom surface 211.

EXAMPLES

Figure 4:
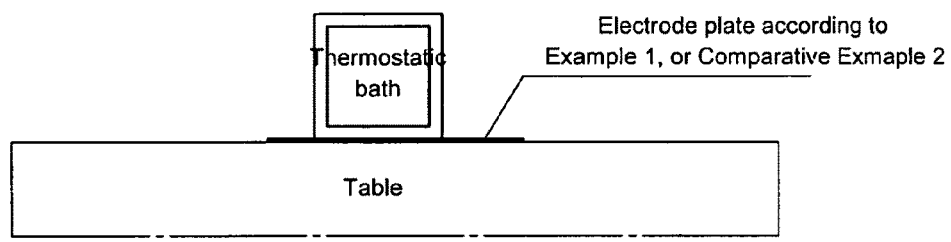
FIG. 4 is a block diagram of a test apparatus used in a comparative test.

A comparative test was performed to determine how much the shelf life of foodstuff could be prolonged by the device according to the present invention. The comparative test was performed by counting the number of bacterial cells grown in foodstuff stored in a thermostatic bath. In this comparative test, the number of viable bacterial cells was counted. A sample under test was commercially-available pudding. The pudding was taken out of its package, stirred and kneaded so as to sufficiently come into contact with air, divided into twenty two 5 g aliquots, and stored in storage bags. The thermostatic bath was a hermetically-sealed resin box measuring 200 mm on a side. The temperature and humidity of the atmosphere in the thermostatic bath were kept at 10° C. and 75%. FIG. 4 is a block diagram of a test apparatus used in the comparative test.

In Example 1, a freshness prolonging device for foodstuff including an electrode plate prepared according to the present invention was used. Specifically, the electrode had the laminated structure of FIG. 2. As an electrically conductive rubber sheet, one made of NR, having a volume intrinsic resistivity of 100 Ωcm, having a thickness of 1 mm and measured 400 mm on each side, was used. An electrode terminal used was a brass mesh attached to the back surface of the electrically conductive rubber sheet. An insulating sheet used was a foamed polyethylene sheet having a thickness of 7 mm. The size of the insulating sheet was the same as that of the electrically conductive rubber sheet. The electrode plate was formed by hermetically sealing, with a fiber-reinforced polyvinyl chloride cover, the electrically conductive rubber sheet, the electrode terminal, and the insulating sheet together. The electrode plate of the device according to Example 1 was placed on a table, and the thermostatic bath was placed on the electrode plate (see FIG. 4). Then, an AC high voltage of 950 V (frequency 60 Hz=commercial frequency) was applied from a power source to the electrically conductive rubber sheet.

As illustrated in FIG. 4, Comparative Example 1 corresponds to a case where foodstuff is stored in a food storage unit without using any means for prolonging the shelf life of foodstuff (i.e., the electrode plate of the test apparatus illustrated in FIG. 4 is omitted). In Comparative Example 2, a freshness prolonging device for foodstuff was prepared in the same manner as in Example 1 except that the electrically conductive rubber sheet of the electrode plate was changed to a copper plate having the same thickness and size. As in the case of Example 1, the electrode plate was placed on the table and the thermostatic bath was placed on the electrode plate (see FIG. 4). Then, an AC high voltage of 950 V (frequency 60 Hz=commercial frequency) was applied from a power source to the copper plate.

A test procedure is as follows. Seven sample aliquots stored in bags were placed in each of the thermostatic baths of Example 1 and Comparative Examples 1 and 2, and one sample aliquot was taken out of each of the thermostatic baths every day to count the number of bacterial cells. On the first day, the number of bacterial cells present in one sample aliquot was counted before storage in the thermostatic bath and was found to be 300 cfu/g or less. The number of bacterial cells counted on the first day was regarded as "0", and an increase in the number of bacterial cells was measured with the lapse of time. A smaller increase in the number of bacterial cells suggests that a longer shelf life of foodstuff is achieved.

Figure 5:
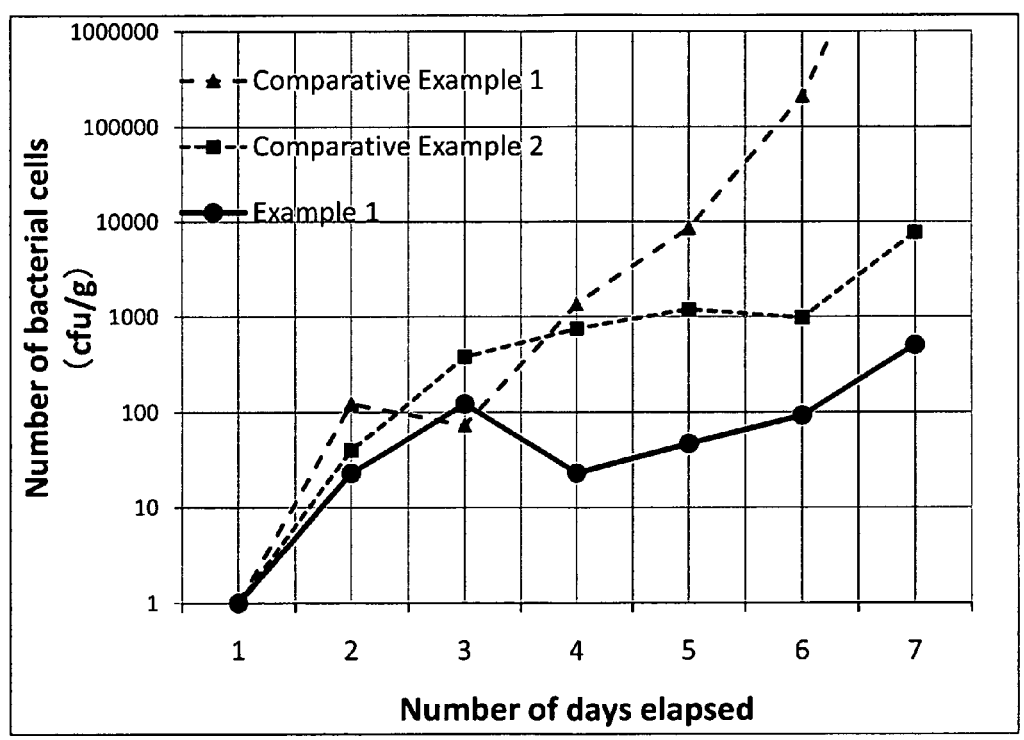
FIG. 5 is a graph showing results of the comparative test performed in Example 1 and Comparative Examples 1 and 2, which represents a relationship between the number of days elapsed and the number of bacterial cells counted.

FIG. 5 is a graph showing the results of the comparative test performed in Example 1 and Comparative Examples 1 and 2, which represents the relationship between the number of days elapsed and the number of bacterial cells counted. In the case of Comparative Example 1, the number of bacterial cells exceeded 1000 cfu/g after a lapse of 3 days, and was then further increased and reached an uncountable level after a lapse of 6 days. In the case of Comparative Example 2, the number of bacterial cells exceeded 1000 cfu/g after a lapse of 4 days, but could be kept below 10000 cfu/g even after a lapse of 7 days. These results indicate that storage of foodstuff in a high electric field atmosphere is effective in prolonging the shelf life of the foodstuff.

On the other hand, in the case of Example 1, the number of bacterial cells was hardly increased even after a lapse of 5 days, and then reached 500 cfu/g for the first time after a lapse of 6 days. However, the number of bacterial cells was kept below 1000 cfu/g even after a lapse of 7 days. It is clear from the result that the freshness prolonging device for foodstuff according to the present invention has the effect of prolonging the shelf life of foodstuff by storing the foodstuff in a high electric field atmosphere. Further, the freshness prolonging device for foodstuff according to the present invention can be evaluated as more effective in prolonging the shelf life of foodstuff than the freshness prolonging device for foodstuff whose electrode plate is composed of a copper plate.

According to the present invention, it is possible to provide a freshness prolonging device for foodstuff which is capable of achieving a longer shelf life of foodstuff than same type of conventional freshness prolonging devices for foodstuff constituted by a metal plate. Further, the freshness prolonging device for foodstuff according to the present invention can be used together with existing food storage units, and its usage is not particularly limited. More specifically, the freshness prolonging device for foodstuff according to the present invention can be used together not only with a food storage unit or facility but also with, for example, a container for temporarily storing foodstuff for transport. This is supported also by the findings from the above comparative test that the shelf life of foodstuff can be prolonged even when the electrode plate of the device according to the present invention is placed outside a thermostatic bath corresponding to a food storage unit. Therefore, the present invention is applicable to prolonging the shelf life of foodstuff in various situations.

What is claimed is:

1. A freshness prolonging device which prolongs shelf life of a foodstuff by storing the foodstuff in a high electric field atmosphere, comprising:
   an electrode plate to be removably mounted on a surface opposed to foodstuff stored in a food storage unit; and
   a power source for applying a high voltage to the electrode plate, wherein
   the electrode plate is composed of an electrically conductive rubber sheet electrically insulated from outside, and
   the electrode plate is formed by hermetically sealing the electrically conductive rubber sheet with a cover composed of a resin sheet.

2. The device according to claim 1, wherein the electrode plate is formed by interposing an insulating sheet between the surface, on which the electrode plate is to be removably mounted, and the electrically conductive rubber sheet.

3. The device according to claim 1, wherein the electrode plate is formed by hermetically sealing, with the cover composed of a resin sheet, the electrically conductive rubber sheet together with an insulating sheet to be interposed between the surface, on which the electrode plate is to be removably mounted, and the electrically conductive rubber sheet.

* * * * *